United States Patent
Smith

[15] 3,636,236
[45] Jan. 18, 1972

[54] REPLACEMENT COVER PLATE FOR ELECTRIC OUTLET BOX

[72] Inventor: Earl E. Smith, Charlevoix, Mich.
[73] Assignee: Lexalite Corporation, Charlevoix, Mich.
[22] Filed: May 1, 1970
[21] Appl. No.: 33,769

[52] U.S. Cl. ............................................. 174/66, 220/24.2
[51] Int. Cl. ................................................. H02g 3/14
[58] Field of Search .................. 174/66, 67; 220/24.2, 24.3; D26/13.2

[56] References Cited

UNITED STATES PATENTS

| | | | |
|---|---|---|---|
| 2,231,001 | 2/1941 | Engstrom | 174/66 |
| 2,599,695 | 6/1952 | Christensen | 317/119 |
| 2,634,016 | 4/1953 | Hagen | 220/24.2 |

Primary Examiner—Lewis H. Myers
Assistant Examiner—D. A. Tone
Attorney—Mason, Kolehmainen, Rathburn & Wyss

[57] ABSTRACT

A replacement cover plate for an electric outlet box installed in a building structure with an open outer end thereof adjacent an original wall surface which is subsequently covered with a new wall covering means of substantial thickness forming a new outer wall surface spaced outwardly of the original. The cover plate of the invention comprises a central segment adapted to close and normally seal against the open end of the box without requiring relocation thereof, a peripheral wall means around the central segment extending outwardly thereof an amount substantially equal to the thickness of said wall covering means, and a peripheral edge flange around said peripheral wall means and parallel of the central segment having an inner face adapted to abut the new outer wall surface.

2 Claims, 4 Drawing Figures

PATENTED JAN 18 1972

3,636,236

INVENTOR:
EARL E. SMITH
BY
Mason, Kolehmainen, Rathburn & Wyss
ATT'YS

REPLACEMENT COVER PLATE FOR ELECTRIC OUTLET BOX

The present invention is directed towards a replacement cover plate for use with an electric outlet box mounted in a building structure. More particularly, the replacement cover plate is especially adapted for use with outlet boxes which are permanently installed in a building wall, floor or ceiling structure and wherein it is undesirable to move or relocate the outlet box, even though the original building wall surface is covered over with a new wall covering means having substantial thickness and forming a new outer wall surface which is spaced outwardly to the open end of the outlet box.

The replacement cover plate of the present invention is useful in home or other building remodeling and is especially handy for do-it-yourselfers who do not wish to get involved in electric problems when paneling a room, or the like. More specifically, the replacement cover plate of the invention provides adequate sealing cover for the electric outlet box without requiring relocation thereof and does not leave an open area between the open outer end of the box and a new outer wall surface of the panel, which could be a fire hazard. Moreover, the replacement cover plate of the present invention does not require relocation of the electrical components within the outlet box, and the original cover plate is merely replaced by the new and improved replacement cover plate which is especially adapted to accommodate the thickness of the new wall panel applied onto the old wall.

It is an object of the present invention to provide a new and improved replacement cover plate for electric outlet boxes and the like installed in a building structure without requiring relocation of the outlet box when a new wall covering means of substantial thickness is applied onto the old wall surface.

More specifically, it is an object of the present invention to provide a new and improved replacement cover plate for an electric outlet box of the character described which does not require relocation of the electric outlet box or relocation of the electrical components mounted in the box.

Another object of the present invention is to provide a new and improved replacement cover plate of the character described which is neat in appearance, relatively low in cost, and which can be produced economically on a mass production basis.

In addition, it is an object of the invention to provide a new and improved cover plate of the character described which does not require any adjustments to make it properly fit for sealing on the open end of an outlet box mounted on a newly paneled wall.

The foregoing and other objects and advantages of the present invention are accomplished in one illustrated embodiment thereof comprising a new and improved replacement cover plate for an electric outlet box having a central segment which is adapted to sealing close against the open end of the outlet box which is spaced inwardly from the outer face of a new wall covering means applied to the original wall surface of a building structure in which the outlet box was previously installed. Peripheral wall means is provided around the central segment of the cover plate extending outwardly an amount substantially equal to the thickness of the new wall covering means and a peripheral edge flange is formed around the peripheral wall means parallel of the central segment and adapted to abut against the outer wall surface of the new wall covering means. The replacement cover plate does not require relocation of the electric outlet box in the newly paneled wall structure or relocation of any of the electrical components, such as switches, convenient outlets, and the like, contained in the outlet box. The new cover plate provides sealing closure for the open end of the outlet box and does not leave an open space around the box between the outer face of the new paneling.

For a better understanding of the invention, reference should be had to the following detailed description and the claims, taken in conjunction with the drawings, in which:

Figure 1:
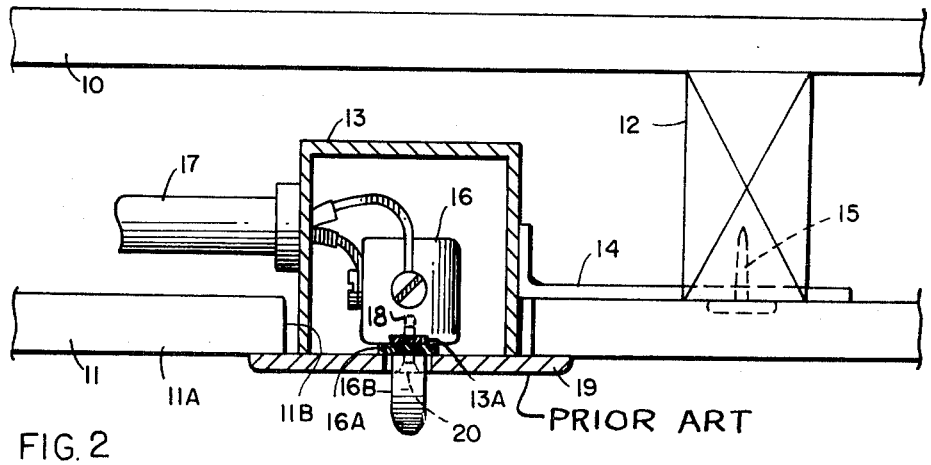
FIG. 1 is a horizontal, cross-sectional view taken through a typical wall construction of a building structure showing an electric outlet box mounted therein in a conventional manner with a prior art cover plate for the box.

Referring now, more particularly, to the drawings, in FIG. 1 is illustrated a typical building wall structure of conventional type including opposite wall surfaces 10 and 11 (for example, wallboard or dry wall) separated and supported by vertical structural members, such as 2×4's 12. A conventional electrical outlet box 13 having an open outer end is mounted within the wall structure between the opposite wall forming members 10 and 11 and the outer open end of the electrical outlet box 13 is normally flush with the outer surface 11A of the wall member 11. The wall member 11 is formed with a generally rectangular opening 11B in a conventional manner to accommodate the outlet box which is supported in place on a bracket 14 having one leg spotwelded or otherwise attached to a sidewall of the box and an outwardly extending leg attached to the 2×4 structural member 12 by means of nails 15. The electric outlet box 13 is adapted to contain an electrical component, such as a switch 16 or a convenience outlet, and electrical current is supplied to the switch through a conduit 17 extending into a punch-out opening formed in the sidewall of the box. In a conventional manner, the switch 16 includes a vertically extending support leg 16A which is attached at opposite ends to upper and lower tabs 13A integrally formed on the upper and lower walls of the outlet box 13. Attachment of the switch support leg to the tabs is provided by means of screws 18 which are threadedly engaged in apertures formed in the support tabs 13A of the outlet box.

The forward open end of the outlet box 13 is sealed or closed by a conventional type cover plate 19 in FIG. 1, and the prior art cover plate 19 is secured in place by means of screws 20. It will be seen from the foregoing, that because of the manner in which the outlet box 13 is mounted in the wall it would be difficult to relocate the box to a position outwardly thereof should a new paneling surface be applied to the outer surface 11A of the original wall member 11 without tearing open a relatively large hole in the wall 11 to expose the box support bracket 14 and the conduit 17.

In accordance with the present invention, a new and improved replacement cover plate 30 is especially adapted to accommodate a new wall covering means, such as paneling or wallboard 21, applied to the outer surface 11A of the old wall member 11 without requiring the relocation of the electric outlet box 13 to accommodate the new outer surface of the panel. In addition, the new and improved recessed cover plate 30 does not require outward relocation of the switch member 16 from the position as originally mounted in the outlet box 13.

The original prior art type cover plate 19 is removed by loosening the screws 20 and, after the new wall cover or paneling 21 is applied over the outer surface 11A of the original wall member 11, the cover plate 30 is easily mounted in place over the open end of the electric outlet box 13 without requiring relocation of the box or requiring relocation of any of the electrical components contained therein.

The new and improved replacement cover plate 30 of the present invention includes a generally rectangular, recessed central segment 31 having an area substantially equal to the open end of the outlet box 13. The central segment 31 is adapted to seal or close against the open end of the outlet box 13, as shown best in FIG. 2, and around the periphery of the central segment is formed an outwardly extending peripheral wall or offset 32 having a width substantially equal to the thickness of the new paneling or wallboard 21. A generally rectangular peripheral cover flange 33 is provided around the outer edge of the wall 32 having an inner face 33A adapted to abut or seal against the new outer surface 21A of the wall paneling 21. With the cover plate 30 installed with the recessed center segment 31 against the outlet box 13, the flange closes the openings 11B and 21B in the wall members 11 and 21 around the outlet box 13.

Figure 2:
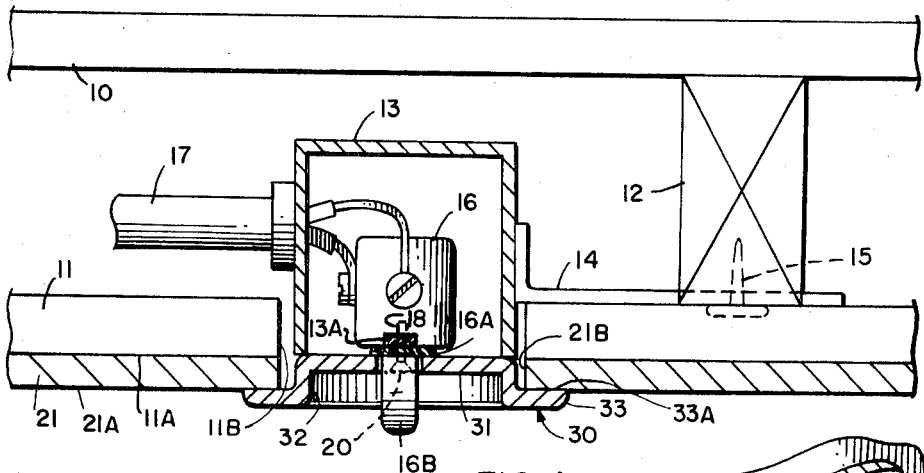
FIG. 2 is a horizontal cross-sectional view showing the wall construction of FIG. 1 with new wall covering means of substantial thickness applied thereon and illustrating a new and improved replacement cover plate for the electric outlet box therein, constructed in accordance with the features of the present invention.

Preferably, the new and improved replacement cover plate 30 is formed of integrally molded resinous plastic, such as polycarbonate resin, which is electrically insulating and has excellent heat-resistant qualities. When installed as shown in FIG. 2, the replacement cover plate fully closes the outer open end of the outlet cover box 13 and seals around the somewhat larger rectangular openings 21B and 11B in the wall members 21 and 11. The replacement outlet cover plate of the present invention does not require the relocation of the electric outlet box 13 and does not even require the relocation of any of the electrical components, such as switches or outlets mounted in the box. Safety standards are maintained because the recessed central segment 31 closes off the forward open end of the outlet box and no open space is left between the box and the edges of the openings 11B or 21B in the wall members 11 and 21. The peripheral wall 32 around the recessed central segment 31 is dimensioned appropriately to accommodate the particular thickness of wall covering means or paneling material 21 applied to the old wall surface and no adjustments are required.

Figure 3:
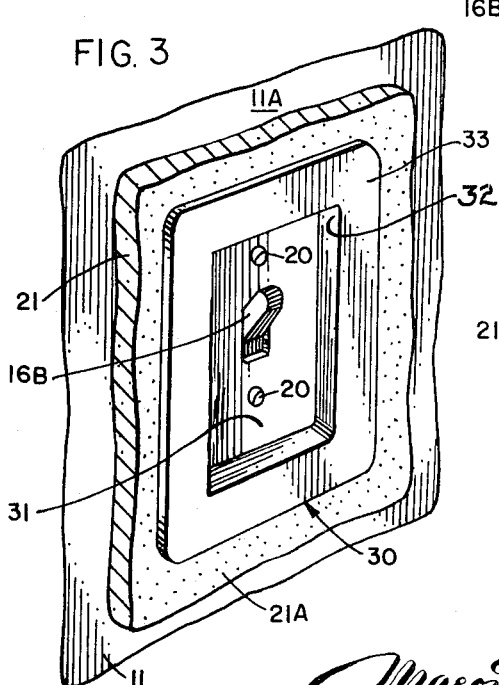
FIG. 3 is a front perspective view showing the replacement cover plate of FIG. 2 as installed in the newly paneled wall construction.
Figure 4:
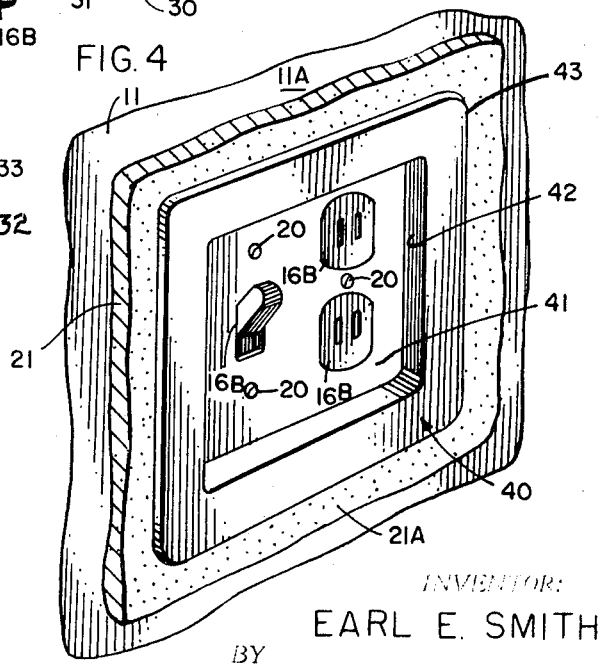
FIG. 4 is a perspective view similar to FIG. 3 showing an embodiment of the invention for use with a double outlet box.

FIG 4 illustrates a recessed cover plate 40 constructed in accordance with the features of the present invention to accommodate a double width outlet box in which a switch and a convenience outlet are mounted. The recessed central segment 41 is dimensioned to fully cover the double outlet, and the wall 42 is dimensioned to accommodate the thickness of the new wall covering or paneling 21. The central segments 31 and 41 of the respective cover plates 30 and 40 are, of course, provided with suitably positioned openings therein for accommodating switch actuators 16B or plug receptacles and the heads of the mounting screws 20, as shown in FIGS. 3 and 4.

While there has been illustrated and described two embodiments of the present invention, it will be apparent that various changes and modifications thereof will occur to those skilled in the art. It is intended in the appended claims to cover all such changes and box as fall within the true spirit and scope of the present invention.

What is claimed as new and desired to be secured by Letters Patent of the United States is:

1. In combination, a replacement cover plate, and an electric outlet box fixedly installed in a building structure, said box having an open outer end adjacent an original wall surface of said structure, said original wall surface covered with a new wall covering means of substantial thickness to form a new outer wall surface spaced outwardly of said original, said cover plate formed of resinous plastic, electrically insulating material comprising a recessed central segment having an inside face abutting against and closing said open end of said outlet box, peripheral wall means integrally formed around said central segment extending outwardly thereof and amount substantially equal to the thickness of said wall covering means, and a peripheral edge flange integrally formed around said peripheral wall means parallel of said central segment and having an inner face abutting said new outer wall surface.

2. The replacement cover plate of claim 1 wherein said central segment is formed with one or more openings therein for accommodating portions of an electrical component mounted in said outlet box.

* * * * *